May 19, 1964
A. GOODHEIM
3,133,530
ROTARY VALVE AND DRIVE MECHANISM
Filed Dec. 13, 1962
3 Sheets-Sheet 1
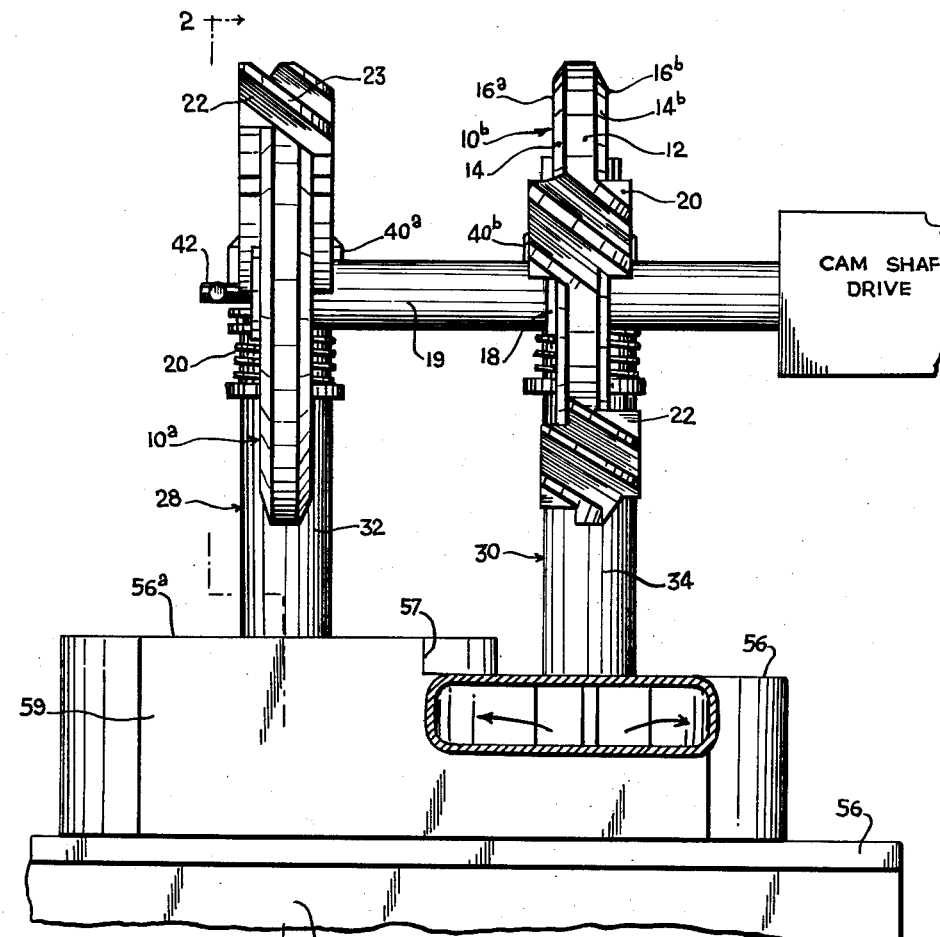
Fig. 1.
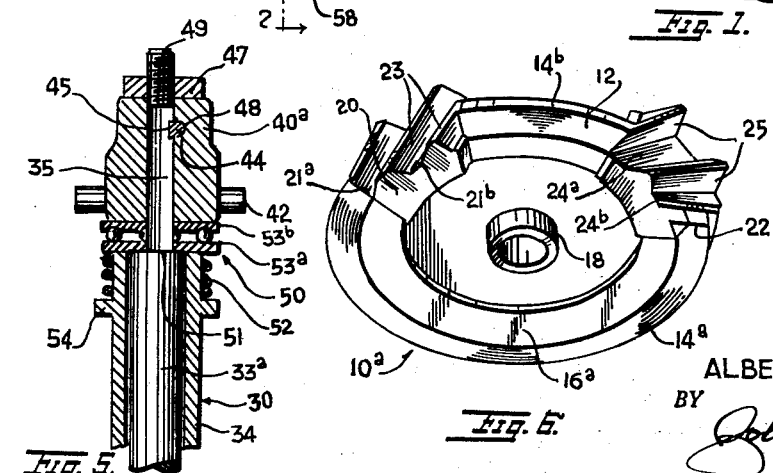
Fig. 5.
Fig. 6.
INVENTOR.
ALBERT GOODHEIM
BY
ATTORNEY May 19, 1964

A. GOODHEIM 3,133,530

ROTARY VALVE AND DRIVE MECHANISM

Filed Dec. 13, 1962

INVENTOR.
ALBERT GOODHEIM
BY
ATTORNEY

May 19, 1964

A. GOODHEIM 3,133,530

ROTARY VALVE AND DRIVE MECHANISM

Filed Dec. 13, 1962

INVENTOR.
ALBERT GOODHEIM
BY
ATTORNEY

United States Patent Office 3,133,530
Patented May 19, 1964

3,133,530
ROTARY VALVE AND DRIVE MECHANISM
Albert Goodheim, 1152 51st St., North Bergen, N.J.
Filed Dec. 13, 1962, Ser. No. 244,525
15 Claims. (Cl. 123—80)

This invention relates to a rotary valve drive mechanism and more particularly concerns a cam-gear drive mechanism for rotary valves in a combustion chamber of an engine cylinder.

The invention has as its principal object provision of cam drivers for rotary valves to impart intermittent timed rotation to the valves, equivalent to that obtained by use of cam driven poppet valves.

A further object is to provide novel cam-gears and a plurality of cam followers having multiple radial pins for engaging the cam-gears.

Another object is to provide a cam-gear drive mechanism as described for a pair of rotary valves controlling inlet and outlet ports respectively of a combustion chamber, the inlet and outlet ports and the rotary valves being offset from each other by a step axially of the valves so that the valves overlap in rotation, for minimizing the transverse dimensions of the combustion chamber.

According to the invention there is provided a mechanism which permits unrestricted flow of gases or fluid through inlet and outlet ports in predetermined timed relation. The invention permits valves of larger diameters to be used for a given size of combustion chamber and enables use of larger inlet and outlet ports for feeding and clearing the combustion chamber more quickly and thoroughly. The mechanism employs less moving parts than prior cam driven poppet valves used for the same purpose. The parts are more rugged, cannot stick, and are more quickly installed and disassembled.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view, partially in vertical section, of a mechanism embodying the invention shown on a cylinder head.

FIG. 5 is a fragmentary sectional view taken on line 5—5 of FIG. 2.

FIG. 6 is an oblique perspective view of a cam-gear employed in the mechanism.

Figure 2:
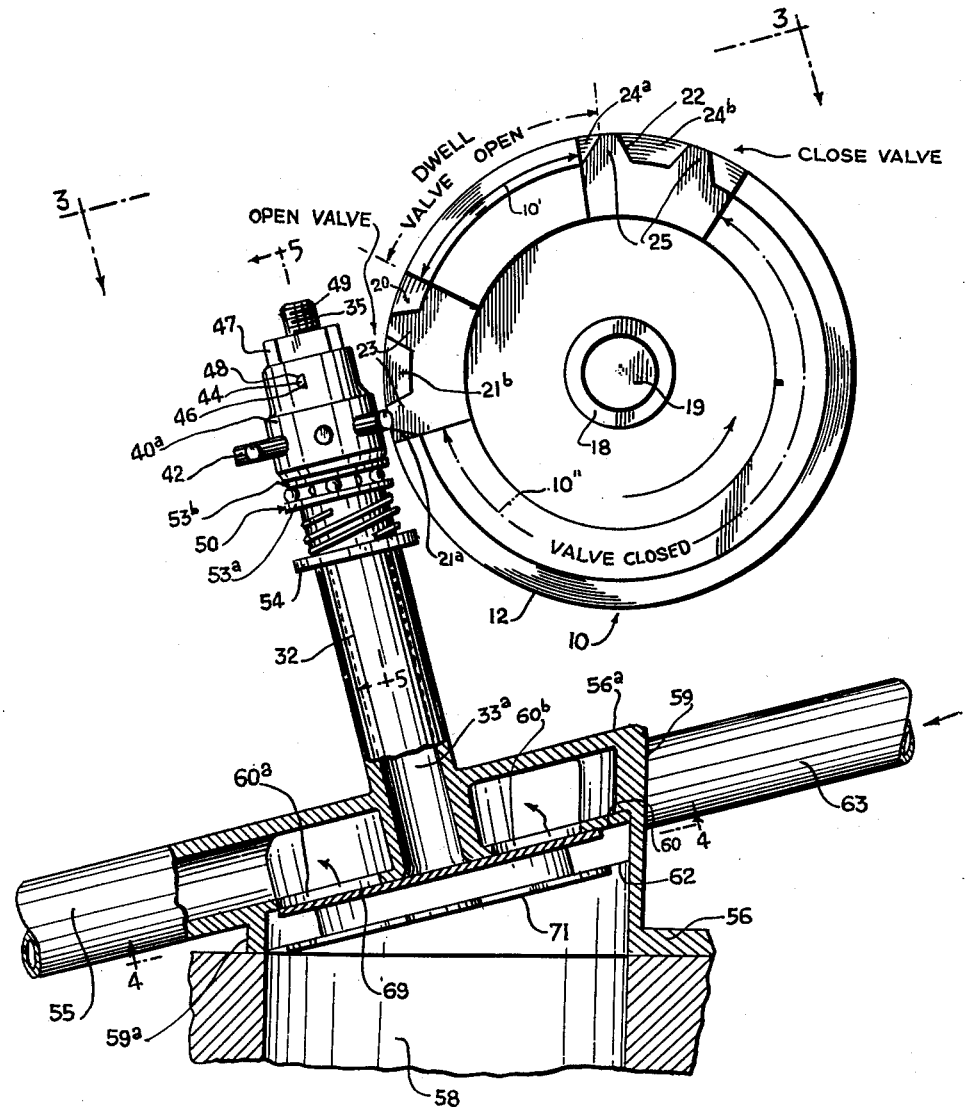
FIG. 2 is a vertical sectional view taken on line 2—2 of FIG. 1.
Figure 3:
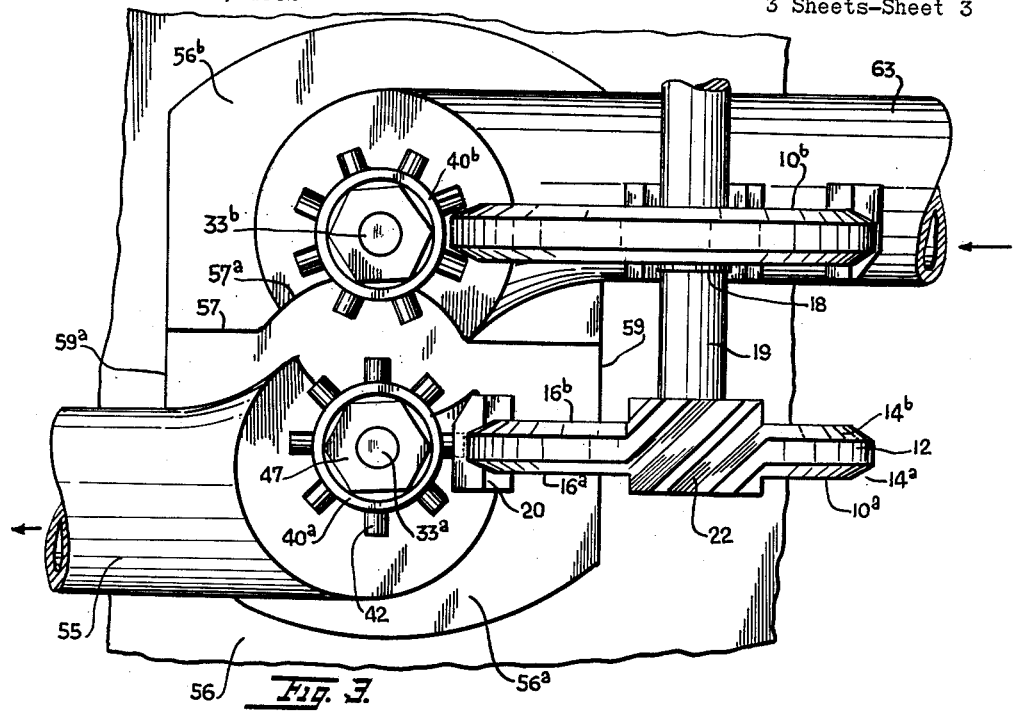
FIG. 3 is an oblique top plan view taken on line 3—3 of FIG. 2.
Figure 4:
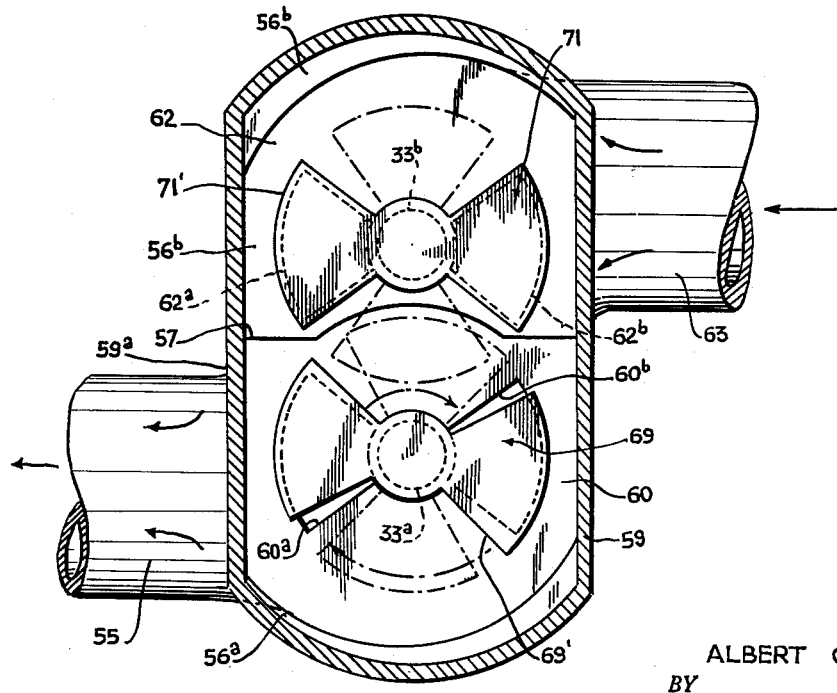
FIG. 4 is an oblique bottom plan view taken on line 4—4 of FIG. 2.

Referring to the drawings, there are shown cam-gears $10^a$, $10^b$, each of which is a circular disc having a cylindrical peripheral wall 12 and two opposing beveled edges $14^a$, $14^b$ angularly disposed to each other and extending between the edges of wall 12 and opposing flat annular parallel faces $16^a$, $16^b$ on opposite sides of the disc. Each disc has a central hub 18 provided with a central bore in which is fitted a shaft 19 for driving the discs in a counterclockwise direction as viewed in FIG. 2.

Each disc has two rectangular gear sections 20 and 22 spaced 90° apart at the periphery of the disc and extending outwardly of opposite sides. Each of the gear sections is cut like a worm gear with teeth and grooves. Gear section 20 has two grooves $21^a$, $21^b$ defined between teeth 23 and gear section 22 has two grooves $24^a$, $24^b$ defined between teeth 25; see FIGS. 1, 2, 3 and 6.

Two rotary valve assemblies 28, 30 are provided for the mechanism. The valve assemblies have cylindrical valve housings 32, 34 disposed axially parallel to each other. The valve assemblies are generally tangential to the peripheries of the cam-gears $10^a$, $10^b$, respectively, and the central planes of the cam-gears are coplanar with the axes of the valve housings 32, 34. Housing 32 is slightly shorter than housing 34 for reasons explained below.

Disposed axially in the valve housings are cylindrical valve stems $33^a$, $33^b$. Each valve stem terminates in an outer end 35 of reduced diameter which is fitted in bore 38 of a cam follower $40^a$ or $40^b$. Each cam follower is a generally cylindrical member with a plurality of radially extending pins 42 equally spaced around the body of the cam follower. Eight pins are shown in FIG. 2 provided for each cam follower but more or less equally spaced pins could be used. A pin 44 having a flattened side or land 46 is inserted in a hole 48 in the body of each cam follower and engages a flat or land 45 on stem end 35. This pin prevents rotation of the cam follower with respect to the stem. A nut 47 is screwed on the free end of the stem which is threaded at 49 to receive the nut. This nut limits end play in the valve assembly and prevents vibration in the valve during operation of the mechanism.

A thrust bearing 50 is located on the shoulder 51 of each valve stem. A coil spring 52 is compressed between race $53^a$ of the bearing and an annular flange 54 extending radially of housing 32 and 34. Race $53^b$ of the bearing abuts the cam follower. Spring 52 provides an outward bias or loading to the valve stem. The valve housings are integral with a cylinder head 56 on a combustion chamber 58. Head 56 has a step 57 so that head portion $56^a$ is offset from adjacent head portion $56^b$ axially of housings 32, 34. Housing 32 extends obliquely upwardly from higher head portion $56^a$ while housing 34 extends obliquely upward from lower head portion $56^b$. The head portions $56^a$, $56^b$ are inclined to the horizontal plane of head 56, so that the head portion $56^b$ extends angularly downwardly from the upper edge of flat vertical head wall 59 to the plane of head 56, while the head portion $56^a$ extends angularly downward from a higher upper edge portion of wall 59 to the upper edge of a narrow vertical head wall $59^a$.

Head 56 has two exhaust ports $60^a$, $60^b$ in a seat 60 under head portion $56^a$ opening into a common exhaust manifold 55 extending outwardly of the head 56. A double, butterfly type of valve member 69 is secured to the end of valve stem $33^a$. The wings $69'$ of the valve member 69 are diametrally opposed and simultaneously open and close the two diametrally opposed ports $60^a$, $60^b$ as the valve member rotates. Another double, butterfly type of valve member 71 is secured to the end of stem $33^b$ and rotates so that its wings $71'$ open and close diametrally opposed inlet ports $62^a$, $62^b$ in a seat 62 under the lower head portion $56^b$. These ports communicate with a common inlet duct 63 which extends outwardly of the head 56.

It will be noted that the wall of the step 57 has an outwardly bowed portion $57^a$. Due to the stepped arrangement of the valve head, the distance between the axes of the stems $33^a$, $33^b$ may be made less than the diameter of each of the valve members 69, 71. Thus the valve members 69, 71 may overlap during rotation thereof without interference with each other. This arrangement permits larger valve members and larger inlet and outlet ports to be used for a given size of combustion chamber than is possible where the valve members are not overlapped and the plane of the inlet ports is not offset from the plane of the outlet ports. As a result of this stepped arrangement of valves and ports, the combustion chamber can be filled with fuel more quickly and can be cleared more quickly than is possible with other combustion chambers of the same size but with smaller ports and valves.

In operation of the mechanism, shaft 19 rotates the cam-gears 10ª, 10ᵇ continuously. During each revolution of the cam-gears, first gear section 20 and then gear section 22 engages the pins 42 of its associated cam follower in turn. Gear section 20, which leads, serves to open a closed valve by turning a cam follower 90°. Then the circumferentially short beveled portion 10' between the sections 20, 22 of the cam-gear rotates between two adjacent pins holding the valve open for a predetermined dwell interval. The gear section 22 then engages the pins 42 of the cam follower of the open valve and rotates the valve 90° to close it. Thereafter the circumferentially long portion 10" of the cam-gear rides between two pins of the cam follower of the closed valve holding the valve closed for about 220°. Then the gear section 20 comes around again to open the closed valve.

It will be noted that each valve is rotated only one quarter turn each time to open and close it. The valves 69, 71 are alternately opened and closed so that the inlet and exhaust ports are alternately opened and closed. The pins 42 follow the grooves in the gear sections and the valves stop turning as the gear sections pass the pins. Opening of one of the valves while the other one is closed or closing and vice versa can be preset by fixing the two cam-gears on shaft 19 so that gear sections 20 and 22 of the two cam-gears are out of alignment with each other axially of the cam-gears and shaft. Thus, the mechanism provides precise timing of the opening and closing of the valves during each revolution of the cam-gears regardless of how fast or slow the shaft 19 rotates, and opening and closing of the ports is maintained with precision and cannot get out of adjustment.

The mechanism is easily disassembled for adjustment, cleaning and replacement of parts. It is very rugged in construction and accomplishes the intended purpose with less parts and with more reliability than has been possible with conventional cam driven valves.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A drive mechanism for a rotary valve, comprising a rotatable circular disc having two circumferentially spaced peripheral sections formed with worm grooves and teeth, the remainder of the periphery of the disc having opposing beveled edges, a support, a generally cylindrical valve assembly on said support, said assembly having its axis disposed in the central plane of said disc, said assembly having an axial stem carrying a valve member at one end for opening and closing ports in the support, a generally cylindrical cam follower secured to the other end of said stem for rotating the stem and valve member, and a plurality of pins extending radially from said cam follower and engaged with the periphery of the disc for holding the valve member in one position with respect to said ports as the disc rotates, said pins engaging the teeth and grooves of the said two sections in turn as the disc rotates to turn said valve member into and out of said one position.

2. A drive mechanism for a rotary valve, comprising a rotatable circular disc having two circumferentially spaced peripheral sections formed with worm grooves and teeth, the remainder of the periphery of the disc having opposing beveled edges, a support, a generally cylindrical valve assembly on said support, said assembly having its axis disposed in the central plane of said disc, said assembly having an axial stem carrying a valve member at one end for opening and closing ports in the support, a generally cylindrical cam follower secured to the other end of said stem for rotating the stem and valve member, and a plurality of pins extending radially from said cam follower and engaged with the periphery of the disc for holding the valve member in one position with respect to said ports as the disc rotates, said pins engaging the teeth and grooves of the said two sections in turn as the disc rotates to turn said valve member into and out of said one position, said valve member having a butterfly shape with two diametrally aligned wings, said ports being two in number and disposed in diametrally aligned positions for simultaneous opening by the wings and for simultaneous closing by the wings as the valve member rotates.

3. A drive mechanism for intermittently opening and closing ports of a combustion chamber, comprising a support having inlet and outlet ports spaced apart from each other, a drive shaft rotatably carrying two circular discs, each disc having two circumferentially spaced peripheral gear sections formed with worm grooves and teeth, the remainder of the periphery of the disc having opposing beveled edges, a pair of generally cylindrical valve assemblies mounted on said support, said assemblies having axes parallel and coplanar with each other, and the central planes of said discs being coplanar with the respective axes of said assemblies, said assemblies having axial stems carrying valve members at one end for opening and closing said inlet and outlet ports respectively, generally cylindrical cam followers secured to the other end of the valve stems respectively for rotating the valve stems and valve members, and a plurality of pins on each of the cam followers extending radially thereof and engaging the peripheries of the respective discs at circumferentially spaced positions for holding the valve members in predetermined positions with respect to the ports while the discs rotate, the pins of each cam follower engaging the grooves and teeth of each gear section of a disc for sequentially opening and closing in turn the ports controlled by the valve member rotated by each cam follower.

4. A drive mechanism for intermittently opening and closing ports of a combustion chamber, comprising a support having inlet and outlet ports spaced apart from each other, a drive shaft rotatably carrying two circular discs, each disc having two circumferentially spaced peripheral gear sections formed with worm grooves and teeth, the remainder of the periphery of the disc having opposing beveled edges, a pair of generally cylindrical valve assemblies mounted on said support, said assemblies having axes parallel and coplanar with each other, the central planes of said discs being coplanar with the respective axes of said assemblies, said assemblies having axial stems carrying valve members at one end for opening and closing said inlet and outlet ports respectively, generally cylindrical cam followers secured to the other end of the valve stems respectively for rotating the valve stems and valve members, and a plurality of pins on each of the cam followers extending radially thereof and engaging the peripheries of the respective discs at circumferentially spaced positions for holding the valve members in predetermined positions with respect to the ports while the discs rotate, the pins of each cam follower engaging the grooves and teeth of each gear section of a disc for sequentially opening and closing in turn the ports controlled by the valve member rotated by each cam follower, said support having two portions offset from each other axially of said valve assemblies so that the inlet ports are offset from the outlet ports axially of said valve assemblies, the axes of said valve assemblies being spaced apart a distance less than the radius of each of said valve members so that the valve members may overlap during rotation thereof.

5. A drive mechanism for intermittently opening and closing ports of a combustion chamber, comprising a support having inlet and outlet ports spaced apart from each other, a drive shaft rotatably carrying two circular discs, each disc having two circumferentially spaced peripheral gear sections formed with worm grooves and teeth, the remainder of the periphery of the discs having opposing beveled edges, a pair of generally cylindrical valve assemblies mounted on said support, said assemblies having axes parallel and coplanar with each other, the central planes of said discs being coplanar with the respective axes of said assemblies, said assemblies having axial stems carrying valve members at one end for opening and closing said inlet and outlet ports respectively, generally cylindrical cam followers secured to the other end of the valve stems respectively for rotating the valve stems and valve members, and a plurality of pins on each of the cam followers extending radially thereof and engaging the peripheries of the respective discs at circumferentially spaced positions for holding the valve members in predetermined positions with respect to the ports while the discs rotate, the pins of each cam follower engaging the grooves and teeth of each gear section for sequentially opening and closing in turn the ports controlled by the valve member rotated by each cam follower, each valve member having a butterfly shape with two diametrally aligned wings, said inlet ports being two in number and disposed in diametrally aligned positions for simultaneously opening and closing by the wings of one valve member, said outlet ports being two in number and disposed in diametrally aligned positions for simultaneous opening and closing by the wings of the other valve member.

6. A drive mechanism for intermittently opening and closing ports of a combustion chamber, comprising a support having inlet and outlet ports spaced apart from each other, a drive shaft rotatably carrying two circular discs, each disc having two circumferentially spaced peripheral gear sections formed with worm grooves and teeth, the remainder of the periphery of the discs having opposing beveled edges, a pair of generally cylindrical valve assemblies mounted on said support, said assemblies having axes parallel and coplanar with each other, the central planes of said discs being coplanar with the respective axes of said assemblies, said assemblies having axial stems carrying valve members at one end for opening and closing said inlet and outlet ports respectively, generally cylindrical cam followers secured to the other end of the valve stems respectively for rotating the valve stems and valve members, and a plurality of pins on each of the cam followers extending radially thereof and engaging the peripheries of the respective discs at circumferentially spaced positions for holding the valve members in predetermined positions with respect to the ports while the discs rotate, the pins of each cam follower engaging the grooves and teeth of each gear section for sequentially opening and closing in turn the ports controlled by the valve member rotated by each cam follower, each valve member having a butterfly shape with two diametrally aligned wings, said inlet ports being two in number and disposed in diametrally aligned positions for simultaneously opening and closing by the wings of one valve member, said outlet ports being two in number and disposed in diametrally aligned positions for simultaneous opening and closing by the wings of the other valve member, said support having two portions offset from each other axially of said valve assemblies so that the inlet ports are offset from the outlet ports axially of said valve assemblies, the axes of said valve assemblies being spaced apart a distance less than the radius of each of said valve members so that the valve members may overlap during rotation thereof.

7. A drive mechanism for intermittently opening and closing ports of a combustion chamber, comprising a support having inlet and outlet ports spaced apart from each other, a drive shaft rotatably carrying two circular discs, each disc having two circumferentially spaced peripheral gear sections formed with worm grooves and teeth, the remainder of the periphery of the disc having opposing beveled edges, a pair of generally cylindrical valve assemblies mounted on said support, said assemblies having axes parallel and coplanar with each other, the central planes of said discs being coplanar with the respective axes of said assemblies, said assemblies having axial stems carrying valve members at one end for opening and closing said inlet and outlet ports respectively, generally cylindrical cam followers secured to the other end of the valve stems respectively for rotating the valve stems and valve members, and a plurality of pins on each of the cam followers extending radially thereof and engaging the peripheries of the respective discs at circumferentially spaced positions for holding the valve members in predetermined positions with respect to the ports while the discs rotate, the pins of each cam follower engaging the grooves and teeth of each gear section for sequentially opening and closing in turn the ports controlled by the valve member rotated by each cam follower, each valve member having a butterfly shape with two diametrally aligned wings, said inlet ports being two in number and disposed in diametrally aligned positions for simultaneously opening and closing by the wings of one valve member, said outlet ports being two in number and disposed in diametrally aligned positions for simultaneous opening and closing by the wings of the other valve member, the gear sections of the disc being spaced apart circumferentially less than 90° so that the inlet and outlet ports are each open during not more than 90° of each revolution of the disc and are closed during the remainder of the revolution of the disc.

8. A drive mechanism for intermittently opening and closing ports of a combustion chamber, comprising a support having inlet and outlet ports spaced apart from each other, a drive shaft rotatably carrying two circular discs, each disc having two circumferentially spaced peripheral gear sections formed with worm grooves and teeth, the remainder of the periphery of the disc having opposing beveled edges, a pair of generally cylindrical valve assemblies mounted on said support, said assemblies having axes parallel and coplanar with each other, the central planes of said discs being coplanar with the respective axes of said assemblies, said assemblies having axial stems carrying valve members at one end for opening and closing said inlet and outlet ports respectively, generally cylindrical cam followers secured to the other end of the valve stems respectively for rotating the valve stems and valve members, and a plurality of pins on each of the cam followers extending radially thereof and engaging the peripheries of the respective discs at circumferentially spaced positions for holding the valve members in predetermined positions with respect to the ports while the discs rotate, the pins of each cam follower engaging the grooves and teeth of each gear section for sequentially opening and closing in turn the ports controlled by the valve member rotated by each cam follower, each valve member having a butterfly shape with two diametrally aligned wings, said inlet ports being two in number and disposed in diametrally aligned positions for simultaneously opening and closing by the wings of one valve member, said outlet ports being two in number and disposed in diametrally aligned positions for simultaneous opening and closing by the wings of the other valve member, the gear sections of the disc being spaced apart circumferentially less than 90° so that the inlet and outlet ports are each open during not more than 90° of each revolution of the disc and are closed during the remainder of the revolution of the disc, said support having two portions offset from each other axially of said valve assemblies so that the inlet ports are offset from the outlet ports axially of said valve assemblies, the axes of said valve assemblies being spaced apart a distance less than the radius of each of said valve members so that the valve members may overlap during rotation thereof.

9. A drive mechanism for a rotary valve, comprising a rotatable circular disc having two circumferentially spaced peripheral sections formed with worm grooves and teeth, the remainder of the periphery of the disc having opposing beveled edges, a support, a generally cylindrical valve assembly on said support, said assembly having its axis disposed in the central plane of said disc, said assembly having an axial stem carrying a valve member at one end for opening and closing ports in the support, a generally cylindrical cam follower secured to the other end of said stem for rotating the stem and valve member, and a plurality of pins extending radially from said cam follower and engaged with the periphery of the disc for holding the valve member in one position with respect to said ports as the disc rotates, said pins engaging the teeth and grooves of the said two sections in turn as the disc rotates to turn said valve member into and out of said one position, said valve member having a butterfly shape with two diametrally aligned wings, said ports being two in number and disposed in diametrally aligned positions for simultaneous opening by the wings and for simultaneous closing by the wings as the valve member rotates, the gear sections of the disc being spaced apart circumferentially less than 90° so that the ports are each open during not more than 90° of each revolution of the disc and are closed during the remainder of the revolution of the disc.

10. A drive mechanism for a rotary valve, comprising a rotatable circular disc having two circumferentially spaced peripheral sections formed with worm grooves and teeth, the remainder of the periphery of the disc having opposing beveled edges, a support, a generally cylindrical valve assembly on said support, said assembly having its axis disposed in the central plane of said disc, said assembly having an axial stem carrying a valve member at one end for opening and closing ports in the support, a generally cylindrical cam follower secured to the other end of said stem for rotating the stem and valve member, and a plurality of pins extending radially from said cam follower and engaged with the periphery of the disc for holding the valve member in one position with respect to said ports as the disc rotates, said pins engaging the teeth and grooves of the said two sections in turn as the disc rotates to turn said valve member into and out of said one position, said valve member having a butterfly shape with two diametrally aligned wings, said ports being two in number and disposed in diametrally aligned positions for simultaneous opening by the wings and for simultaneous closing by the wings as the valve member rotates, said valve assembly including a generally cylindrical housing having a peripheral flange, a coil spring on said flange around the housing, and a thrust bearing assembly engaged by said coil spring, said cam follower being engaged by said bearing assembly and spring biased axially outward of said support, so that said valve member is seated under the spring bias against said support for completely closing the ports.

11. A drive mechanism for intermittently opening and closing ports of a combustion chamber, comprising a support having inlet and outlet ports spaced apart from each other, a drive shaft rotatably carrying two circular discs, each disc having two circumferentially spaced peripheral gear sections formed with worm grooves and teeth, the remainder of the periphery of the discs having opposing beveled edges, a pair of generally cylindrical valve assemblies mounted on said support, said assemblies having axes parallel and coplanar with each other, the central planes of said discs being coplanar with the respective axes of said assemblies, said assemblies having axial stems carrying valve members at one end for opening and closing said inlet and outlet ports respectively, generally cylindrical cam followers secured to the other end of the valve stems respectively for rotating the valve stems and valve members, and a plurality of pins on each of the cam followers extending radially thereof and engaging the peripheries of the respective discs at circumferentially spaced positions for holding the valve members in predetermined positions with respect to the ports while the discs rotate, the pins of each cam follower engaging the grooves and teeth of each gear section for sequentially opening and closing in turn the ports controlled by the valve member rotated by each cam follower, each valve member having a butterfly shape with two diametrally aligned wings, said inlet ports being two in number and disposed in diametrally aligned positions for simultaneously opening and closing by the wings of one valve member, said outlet ports being two in number and disposed in diametrally aligned positions for simultaneous opening and closing by the wings of the other valve member, each valve assembly including a generally cylindrical housing having a peripheral flange, a coil spring on said flange around the housing, and a thrust bearing assembly engaged by said coil spring, the cam follower on the housing being engaged by the bearing assembly and spring biased axially outward of said support, whereby each valve member is seated under spring bias against said support for completely closing the ports as the valve members rotate.

12. A drive mechanism according to claim 11, wherein said support has two portions offset from each other axially of said valve assemblies so that the inlet ports are offset from the outlet ports axially of said valve assemblies, the axes of said valve assemblies being spaced apart a distance less than the radius of each of said valve members so that the valve members may overlap during rotation thereof.

13. A drive mechanism for a rotary valve, comprising a rotatable circular disc having two circumferentially spaced peripheral sections formed with worm grooves and teeth, the remainder of the periphery of the disc having opposing beveled edges, a support, a generally cylindrical valve assembly on said support, said assembly having its axis disposed in the central plane of said disc, said assembly having an axial stem carrying a valve member at one end for opening and closing port in the support, a generally cylindrical cam follower secured to the other end of said stem for rotating the stem and valve member, and a plurality of pins extending radially from said cam follower and engaged with the periphery of the disc for holding the valve member in one position with respect to said ports as the disc rotates, said pins engaging the teeth and grooves of the said two sections in turn as the disc rotates to turn said valve member into and out of said one position, said valve member having a butterfly shape with two diametrally aligned wings, said ports being two in number and disposed in diametrally aligned positions for simultaneous opening by the wings and for simultaneous closing by the wings as the valve member rotates, said valve assembly including a generally cylindrical housing having a peripheral flange, a coil spring on said flange around the housing, and a thrust bearing assembly engaged by said coil spring, said cam follower being engaged by said bearing assembly and spring biased axially outward of said support, so that said valve member is seated under the spring bias against said support for completely closing the ports, the gear sections of the disc being spaced apart circumferentially less than 90° so that the ports are each open during not more than 90° of each revolution of the disc and are closed during the remainder of the revolution of the disc.

14. A drive mechanism for intermittently opening and closing ports of a combustion chamber, comprising a support having inlet and outlet ports spaced apart from each other, a drive shaft rotatably carrying two circular discs, each disc having two circumferentially spaced peripheral gear sections formed with worm grooves and teeth, the remainder of the periphery of the disc having opposing beveled edges, a pair of generally cylindrical valve assemblies mounted on said support, said assemblies having axes parallel and coplanar with each other, the central planes of said disc being coplanar with the respective axes of said assemblies, said assemblies having axial stems carrying valve members at one end for opening and closing said inlet and outlet ports respectively, generally cylindrical cam followers secured to the other end of the valve stems respectively for rotating the valve stems and valve members, and a plurality of pins on each of the cam followers extending radially thereof and engaging the peripheries of the discs at circumferentially spaced positions for holding the valve members in predetermined positions with respect to the ports while the disc rotate, the pins of each cam follower engaging the grooves and teeth of each gear section for sequentially opening and closing in turn the ports controlled by the valve member rotated by each cam follower, each valve member having a butterfly shape with two diametrically aligned wings, said inlet ports being two in number and disposed in diametrically aligned positions for simultaneously opening and closing by the wings of one valve member, said outlet ports being two in number and disposed in diametrically aligned positions for simultaneous opening and closing by the wings of the other valve member, the gear sections of the disc being spaced apart circumferentially less than 90° so that the inlet and outlet ports are each open during not more than 90° of each revolution of the disc and are closed during the remainder of the revolution of the disc, each valve assembly including a generally cylindrical housing having a peripheral flange, a coil spring on said flange around the housing, and a thrust bearing assembly engaged by said coil spring, the cam follower on the housing being engaged by the bearing assembly and spring biased axially outward of said support, whereby each valve member is seated under spring bias against said support for completely closing the ports as the valve members rotate.

15. A drive mechanism according to claim 14, wherein said support has two portions offset from each other axially of said valve assemblies so that the inlet ports are offset from the outlet ports axially of said valve assemblies, the axes of said valve assemblies being spaced apart a distance less than the radius of each of said valve members so that the valve members may overlap during rotation thereof.

References Cited in the file of this patent

UNITED STATES PATENTS

| | | |
|---|---|---|
| 1,189,281 | Mueller et al. | July 4, 1916 |
| 1,230,286 | Elliott | June 19, 1917 |
| 2,457,206 | Carlson | Dec. 28, 1948 |
| 2,530,563 | Baxter | Nov. 21, 1950 |
| 3,057,215 | Stewart | Oct. 9, 1962 |

FOREIGN PATENTS

| | | |
|---|---|---|
| 14,608 | France | Nov. 6, 1911 |